(12) United States Patent
Hoennige et al.

(10) Patent No.: US 10,338,595 B2
(45) Date of Patent: Jul. 2, 2019

(54) METHOD FOR TREATING A FLOOR SURFACE AND FLOOR TREATING APPARATUS

(71) Applicant: Alfred Kärcher GmbH & Co. KG, Winnenden (DE)

(72) Inventors: Heiko Hoennige, Weissach im Tal (DE); Christian Hofner, Welzheim (DE); Carsten Eckart, Ludwigsburg (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 148 days.

(21) Appl. No.: 15/424,222

(22) Filed: Feb. 3, 2017

(65) Prior Publication Data
US 2017/0147000 A1 May 25, 2017

Related U.S. Application Data

(63) Continuation of application No. PCT/EP2014/066940, filed on Aug. 6, 2014.

(51) Int. Cl.
*G05D 1/02* (2006.01)
*A47L 9/28* (2006.01)
(Continued)

(52) U.S. Cl.
CPC .............. *G05D 1/0219* (2013.01); *A47L 9/28* (2013.01); *A47L 11/24* (2013.01); *A47L 11/28* (2013.01);
(Continued)

(58) Field of Classification Search
CPC .......... G05D 1/0219; G05D 2201/0203; A47L 9/28; A47L 11/24; A47L 11/28; A47L 11/4011; A47L 2201/04
See application file for complete search history.

(56) References Cited

U.S. PATENT DOCUMENTS

| 5,341,540 A | 8/1994 | Soupert et al. |
| 5,353,224 A | 10/1994 | Lee et al. |

(Continued)

FOREIGN PATENT DOCUMENTS

| EP | 0 382 693 | 10/1994 |
| EP | 1 557 730 | 7/2005 |

(Continued)

OTHER PUBLICATIONS

Huang, W. H., "Optimal Line-sweep-based Decompositions for Coverage Algorithms," International Conference on Robotics & Automation. Seoul, Korea. May 21-26, 2001. Department of Computer Science, Rensselaer Polytechnic Institute.

*Primary Examiner* — Todd M Melton
(74) *Attorney, Agent, or Firm* — Womble Bond Dickinson (US) LLP

(57) ABSTRACT

A method for treating a floor surface is provided using a self-propelled and self-steering floor treating apparatus, wherein the treatment is based on a pattern along which the floor treating apparatus is moved, wherein the pattern has paths in side-by-side relationship to one another, and wherein when the floor treating apparatus travels a path, a respective treatment area is covered and treated. The pattern is adapted to at least one of the size and contour of the floor surface such that boundaries thereof opposite each other each have a path extending therealong with a treatment area adjacent to the boundary and intermediate paths are arranged such that full-coverage treatment of the floor surface is realized, wherein the relative position of at least two paths in side-by-side relationship is such that the treatment areas thereof at least partially overlap. A floor treatment apparatus for carrying out the method is also provided.

18 Claims, 2 Drawing Sheets

(51) Int. Cl.
  *A47L 11/40*    (2006.01)
  *A47L 11/24*    (2006.01)
  *A47L 11/28*    (2006.01)

(52) U.S. Cl.
  CPC ....... *A47L 11/4011* (2013.01); *A47L 2201/04*
       (2013.01); *G05D 2201/0203* (2013.01)

(56) References Cited

U.S. PATENT DOCUMENTS

| | | | |
|---|---|---|---|
| 5,440,216 A | | 8/1995 | Kim |
| 5,896,488 A | | 4/1999 | Jeong |
| 5,998,953 A | * | 12/1999 | Nakamura ........... G05D 1/0219 |
| | | | 15/49.1 |
| 6,370,453 B2 | | 4/2002 | Sommer |
| 6,574,536 B1 | | 6/2003 | Kawagoe et al. |
| 6,667,592 B2 | | 12/2003 | Jacobs et al. |
| 6,830,120 B1 | * | 12/2004 | Yashima ................ A47L 11/10 |
| | | | 15/340.1 |
| 9,596,971 B2 | * | 3/2017 | Yoon ..................... G05D 1/0219 |
| 9,723,962 B2 | * | 8/2017 | Yoon ..................... A47L 9/2815 |
| 9,808,137 B2 | * | 11/2017 | Lamon ................. G05D 1/0219 |
| 10,045,675 B2 | * | 8/2018 | Haegermarck ....... A47L 9/0488 |
| 2004/0211444 A1 | | 10/2004 | Taylor et al. |
| 2005/0000543 A1 | | 1/2005 | Taylor et al. |
| 2009/0281661 A1 | | 11/2009 | Dooley et al. |

FOREIGN PATENT DOCUMENTS

| | | | | |
|---|---|---|---|---|
| EP | | 1 983 396 | 10/2008 | |
| WO | WO-2015090398 A1 | * | 6/2015 | ........... A47L 9/0488 |

\* cited by examiner

METHOD FOR TREATING A FLOOR SURFACE AND FLOOR TREATING APPARATUS

CROSS-REFERENCE TO RELATED APPLICATIONS

This application is a continuation patent application of international application number PCT/EP2014/066940, filed on Aug. 6, 2014, which is incorporated herein by reference in its entirety and for all purposes.

FIELD OF THE INVENTION

The present invention relates to a method for treating a floor surface using a self-propelled and self-steering floor treating apparatus, wherein the treatment of the floor surface is based on a pattern along which the floor treating apparatus is moved, wherein the pattern has paths in side-by-side relationship to one another and wherein when the floor treating apparatus travels a path, a respective treatment area is covered and treated by the floor treating apparatus.

Furthermore, the invention relates to a floor treating apparatus.

BACKGROUND OF THE INVENTION

Floor treating apparatuses, for example floor cleaning apparatuses, are known which are operable to treat and in particular clean the floor surface on the basis of a method as indicated at the outset. By way of example, a serpentine-shaped meandering pattern is used as the pattern in which paths in side-by-side relationship to one another are traveled by the floor cleaning apparatus alternately in one direction of travel and in the opposite direction of travel. It is also conceivable that a spiral-shaped floor surface boundary-following pattern is used in which the floor treating apparatus moves in a spiral shape (with pointed or rounded corners) parallel to boundaries of the floor surface. The spiral can be run outside-in with a decreasing radius or inside-out with an increasing radius. Paths in side-by-side relationship to one another are traveled by the floor cleaning apparatus along the same direction of travel.

An object underlying the present invention to provide a method of the kind mentioned at the outset and a floor cleaning apparatus for carrying out the method by which treatment of the floor surface giving as full a coverage of the floor surface as possible can be achieved in a simple manner.

SUMMARY OF THE INVENTION

In a first aspect of the invention a method for treating a floor surface using a self-propelled and self-steering floor treating apparatus is provided, wherein the treatment of the floor surface is based on a pattern along which the floor treating apparatus is moved. The pattern has paths in side-by-side relationship to one another, and when the floor treating apparatus travels a path, a respective treatment area is covered and treated by the floor treating apparatus. The pattern is adapted to at least one of the size and contour of the floor surface such that boundaries of the floor surface opposite each other have in each case a path extending therealong with a treatment area adjacent to the boundary, and intermediate paths are arranged such that full-coverage treatment of the floor surface is realized. The relative position of at least two paths in side-by-side relationship to one another is selected such that the treatment areas thereof overlap at least in sections thereof.

In a second aspect of the invention, a self-propelled and self-steering floor treating apparatus for carrying out the method in accordance with the first aspect comprises a chassis for travelling over the floor surface and a control unit for controlling the chassis and at least one floor treating unit defining a treatment area. The chassis is controllable by the control unit such that the treatment of the floor surface can be based on a pattern along which the floor treating apparatus is moved. The pattern comprises paths in side-by-side relationship to one another, and when the floor treating apparatus travels a path, the respective treatment area is covered and treated by the floor treating apparatus. The pattern is, by way of the control unit, adaptable to at least one of the size and contour of the floor surface such that boundaries of the floor surface opposite each other have in each case a path extending therealong with a treatment area adjacent to the boundary, and intermediate paths are arrangeable such that full-coverage treatment of the floor surface is realized. The relative position of at least two paths extending in side-by-side relationship to one another is selected such that the treatment areas thereof overlap at least in sections thereof.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
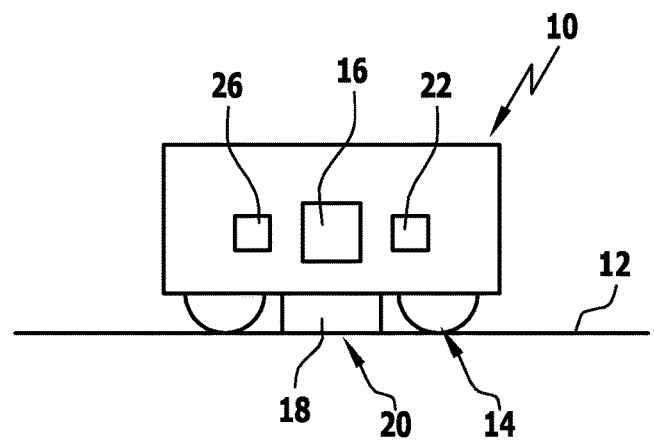
FIG. 1 is a schematic representation of a floor treating apparatus constructed in accordance with the invention, configured as a floor cleaning apparatus.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a method for treating a floor surface using a self-propelled and self-steering floor treating apparatus, wherein the treatment of the floor surface is based on a pattern along which the floor treating apparatus is moved, wherein the pattern has paths in side-by-side relationship to one another and wherein when the floor treating apparatus travels a path, a respective treatment area is covered and treated by the floor treating apparatus. The pattern is adapted to at least one of the size and contour of the floor surface such that boundaries of the floor surface opposite each other have in each case a path extending therealong with a treatment area adjacent to the boundary, and intermediate paths are arranged such that full-coverage treatment of the floor surface is realized, wherein the relative position of at least two paths in side-by-side relationship to one another is selected such that the treatment areas thereof overlap at least in sections thereof.

In the method in accordance with the invention, the pattern on which the treatment is based can be adapted to the size and/or the contour of the floor surface. Preferably, this is performed by a control unit of the floor treating apparatus. For example, the control unit can analyze a map of the floor surface made available to it or stored in the floor treating apparatus in order to adapt the pattern to the floor surface advantageously. Boundaries of the floor surface opposite each other have in each case a path extending therealong in such a manner that the treatment area is adjacent to the boundary and close-to-the-edge treatment of the floor surface can be performed. Intermediate paths in side-by-side relationship to one another in each case are positioned such that full-coverage treatment of the floor surface can be performed. This is in particular possible by the treatment areas thereof being adjacent to each other. The position of at least two paths in side-by-side relationship to one another is selected such that the treatment areas thereof overlap at least in sections thereof. This enables an adaptation of the pattern to the floor surface to be performed such that no untreated sections of the floor surface remain close to the edge at the boundaries of the floor surface opposite each other.

Here, boundaries that are "opposite each other" are considered to be ones that are not directly adjacent to each other and are separated from one another by at least one further boundary of the floor surface, wherein the boundaries in each case are sides of a polygon enclosing the floor surface.

The boundaries of the floor surface may be physical boundaries, in particular sidewalls of a room comprising the floor surface. Alternatively or additionally, it is conceivable for at least one boundary to be a non-physical boundary. Such a boundary results for example from a segmentation of a room comprising a plurality of segments of the floor surface, wherein the segment of the floor surface that is to be treated is adjacent to another segment of the floor surface along said boundary. It is also possible, for example, for a boundary of the floor surface to lie along a line to which are adjacent segments of the floor surface that have different natures (for example different floor coverings).

The method in accordance with the invention is particularly suited for treating floor surfaces comprising a monotone polygonal enclosure. The floor surface is considered to be "monotone" if every line perpendicular to an imaginary reference line intersects the enclosure of the floor surface at most twice. The method in accordance with the invention is particularly advantageous for use in a convex floor surface, for example a convex floor surface of quadrangular shape. A floor surface is considered to be "convex" if an imaginary connecting line between any two points of the floor surface in each case lies within the floor surface.

"Full-coverage", here, in particular when considering the geometric relationships of the floor treating apparatus, is understood to mean that a complete treatment of the floor surface between the boundaries of the floor surface opposite each other is possible. Possible untreated sections of the floor surface such as customary "spandrels" due to changes in the direction of travel of the floor treating apparatus are not considered covered by the "full-coverage" requirement in this case. In particular, such "spandrels" can occur because the floor treating apparatus requires a minimum radius to change its direction of travel. Such "spandrels" can even be left if the floor treating apparatus changes its travel direction by turning on the spot. Both the foregoing cases can leave a non-treated section of the floor surface, for example between a treatment unit of the floor treating apparatus and the boundary, at the position of a change in direction of travel.

Areas which have not been covered in the treatment, such as the above-mentioned spandrels, can for example be treated after the pattern has been run. Provision may be made for a contour-parallel, close-to-the-edge treatment of the floor surface to be realized in order to cover spandrels existing close to the edge. Uncovered areas can also be specifically approached and treated.

Advantageously, the relative position of more than two paths in side-by-side relationship to one another is selected such that the treatment areas of paths in side-by-side relationship to one another in each case overlap in at least sections thereof. An overall overlap among all of the treatment areas, in a sense, is subdivided in different sections, wherein each section results from there being multiple instances of two paths in side-by-side relationship to one another overlapping at least in sections thereof.

Advantageously, the relative position of all of the paths is selected such that the treatment areas of paths in side-by-side relationship to one another in each case overlap at least in sections thereof.

It is advantageous for the position of the paths to be selected such that the respective overlap is made the same size.

In particular in combination with the last-mentioned advantageous embodiment, the relative position of all paths in side-by-side relationship to one another is preferably selected such that the paths are equidistantly or substantially equidistantly spaced from one another.

Preferably, the number of the paths in side-by-side relationship to one another is selected such that the width of an overall overlap which results from the overlap of the treatment areas of paths in side-by-side relationship to one another is less than the width of a treatment area. Otherwise, the pattern could be adapted to the floor surface such that one of the paths in side-by-side relationship to one another is eliminated in order to reduce the size of the overall overlap. This still enables full-coverage treatment of the floor surface and can avoid putting too much strain on the floor surface.

Paths in side-by-side relationship to one another are preferably oriented parallel to each other, in particular where the boundaries of the floor surface opposite each other extend in parallel to each other.

Provision may be made for the boundaries of the floor surface opposite each other to be oriented at an angle relative to each other. In particular, this may be taken to mean that the boundaries extend along lines that intersect at a point.

Advantageously, when boundaries of the floor surface opposite each other are oriented at an angle relative to each other, the relative position of at least two paths in side-by-side relationship to one another is selected such that these enclose an angle that is preferably less than the angle between the boundaries. This allows the original pattern to be adapted to the contour of the floor surface and change it such that at least two paths in side-by-side relationship to one another are at an incline relative to each other. If the floor surface comprises boundaries opposite each other that are oriented at an angle to each other while paths in side-by-side relationship to one another are maintained in parallel orientation to each other, then this can undesirably lead to the need for a multiplicity of changes in travel direction while reducing path lengths in order to achieve full-coverage treatment of the floor surface. However, the present embodiment has the advantage that in accordance with the invention close-to-the-edge cleaning along the boundaries can be realized. Furthermore, by changing the angle between at least two paths in side-by-side relationship to one another, the otherwise necessary multiplicity of changes in direction of travel can be avoided.

It is advantageous for the relative position of more than two paths in side-by-side relationship to one another to be selected such that these enclose a respective angle.

In particular, it may advantageously be provided that the relative position of all of the paths is selected such that paths in side-by-side relationship to one another in each case enclose an angle.

It is advantageous for the position of the paths to be selected such that the respective angle is of the same size. For example, the paths extend along imaginary lines that originate from a common point of intersection and are spaced at equal angular distances from each other.

It is advantageous for the pattern to be oriented within the floor surface such that the number of changes in direction of travel for full-coverage treatment of the floor surface is minimized. Generally, changes in direction of travel have slower speeds than treatments of the floor surface in which the floor treating apparatus travels along one of the paths. By minimizing the number of changes in direction of travel, the time taken to treat the floor surface can be reduced.

For example, a serpentine-shaped meandering pattern may be used as a basis. By adapting the pattern to the size and/or the contour of the floor surface, the distance between at least two paths in side-by-side relationship to one another and/or the angle between at least two paths in side-by-side relationship to one another can be changed.

For example, running the pattern may be followed by a close-to-the-edge, contour-parallel treatment of the floor surface. In this way, any non-treated areas, for example the above-mentioned "spandrels", can be treated.

Provision may also be made for a spiral-shaped floor surface boundary-following pattern to be used as a basis. The floor treating apparatus can be moved parallel to boundaries of the floor surface, wherein the spiral may be run outside-in or inside-out.

It is advantageous to use, as the floor treating apparatus, a floor cleaning apparatus by which the floor surface is cleaned. In particular, the cleaning may comprise at least one of a suction cleaning, sweeping, wiping, scrubbing, dry cleaning and wet cleaning.

The present invention further relates to a self-propelled and self-steering floor treating apparatus. The floor treating apparatus in accordance with the invention comprises a chassis for travelling over the floor surface and a control unit for controlling the chassis and at least one floor treating unit defining a treatment area, wherein the chassis is capable of being controlled by the control unit such that the treatment of the floor surface is can be based on a pattern along which the floor treating apparatus is moved, wherein the pattern comprises paths in side-by-side relationship to one another and wherein when the floor treating apparatus travels a path, the respective treatment area is covered and treated by the floor treating apparatus. The pattern, by way of the control unit, can be adapted to at least one of the size and contour of the floor surface such that boundaries of the floor surface opposite each other have in each case a path extending therealong with a treatment area adjacent to the boundary and intermediate paths are can be arranged such that full-coverage treatment of the floor surface is realized, wherein the relative position of at least two paths extending in side-by-side relationship to one another is selected such that the treatment areas thereof overlap at least in sections thereof.

The advantages that have already been mentioned in the context of the description of the method in accordance with the invention can also be achieved by the floor treating apparatus. In this respect, reference can be made to the foregoing explanations.

The floor treating apparatus may comprise a storage unit (which may be integrated in the control unit) comprising a map of the floor surface and/or a plurality of patterns that can be used as a basis for the treatment and can be adapted to the size and/or contour of the floor surface. Provision may also be made for the control unit to be provided with a map of the floor surface by an operator.

The floor treating apparatus is preferably a floor cleaning apparatus, wherein the at least one floor treating unit is a floor cleaning unit. The at least one cleaning unit may for example be a brush roll, a disk brush, a disk broom, a suction nozzle or a debris pick-up device.

The above-mentioned method features for defining advantageous exemplary embodiments of the method may also be implemented according to the apparatus of this invention. Accordingly, the respective method feature can be used for defining advantageous embodiments of the floor treating apparatus constructed in accordance with the invention. In this respect, reference can be made to what has been stated above.

FIG. 1 shows in schematic view an advantageous embodiment of a floor treating apparatus constructed in accordance with the invention for carrying out an advantageous exemplary embodiment of a method in accordance with the invention. The floor treating apparatus is configured as a floor cleaning apparatus 10 for cleaning a floor surface 12.

To explain the invention, a rectangular-shaped floor surface 12 is first selected. However, the invention is not limited to treating a rectangular floor surface.

The floor cleaning apparatus 10 comprises a chassis 14 comprising a drive, not illustrated, for travelling over the floor surface 12. The drive is capable of being controlled by a control unit 16 of the floor cleaning apparatus 10. Under the control of the chassis 14 by the control unit 16, the direction of travel of the floor cleaning apparatus 10 over the floor surface 12 can be predetermined.

The floor cleaning apparatus 10 comprises at least one cleaning unit 18 for treating the floor surface 12. The cleaning unit 18 may comprise at least one cleaning tool, such as a brush roll, a disk brush or a disk broom, a suction nozzle or a debris pick-up device. More than one cleaning unit can be present on the floor cleaning apparatus 10.

The cleaning unit 18 defines a treatment area and in particular a cleaning area 20. The cleaning area 20 is covered and cleaned by the cleaning unit 18 when the floor cleaning apparatus 10 travels over the floor surface 12. The cleaning area 20 is in particular defined by the width of the cleaning unit 18 so that the cleaning area 20 takes the shape of a strip when driving, and, in particular, the shape of a straight strip when driving in a straight line. In anticipation of what will be explained subsequently in the context of FIGS. 2 and 3, it is noted that the respective cleaning area 20 extends between the dashed-line contours when the floor cleaning apparatus 10 moves "up" on the drawing sheet and extends between the dotted-line contours when the floor cleaning apparatus 10 moves "down" on the drawing sheet.

The floor cleaning apparatus 10 further comprises a storage unit 22 that is coupled to the control unit 16 and could be integrated therein. Stored in the storage unit 22 is at least one pattern upon which the cleaning of the floor surface 12 can be based and which can be adapted to the latter's size and/or contour in a manner that is explained hereinafter. The pattern is in particular a serpentine-shaped meandering pattern 24 which is used in an advantageous exemplary embodiment of the method.

Further stored in the storage unit 22 is a map of the floor surface 12. The map can be read by the control unit 16 in order to adapt the meandering pattern 24 to the size and/or contour of the floor surface 12.

The floor cleaning apparatus 10 further comprises a localization unit 26 which is coupled to the control unit 16. The localization unit 26 could also be integrated in the control unit 16. The control unit 16 is able to determine the position of the floor cleaning apparatus 10 on the floor surface 12 based on sensor signals from the localization unit 26. This makes it easier for the control unit 16 to control the chassis 14 in a desired manner in order for the floor cleaning apparatus 10 to be capable of being moved along a planned path over the floor surface 12 in order to clean same.

Figure 2:
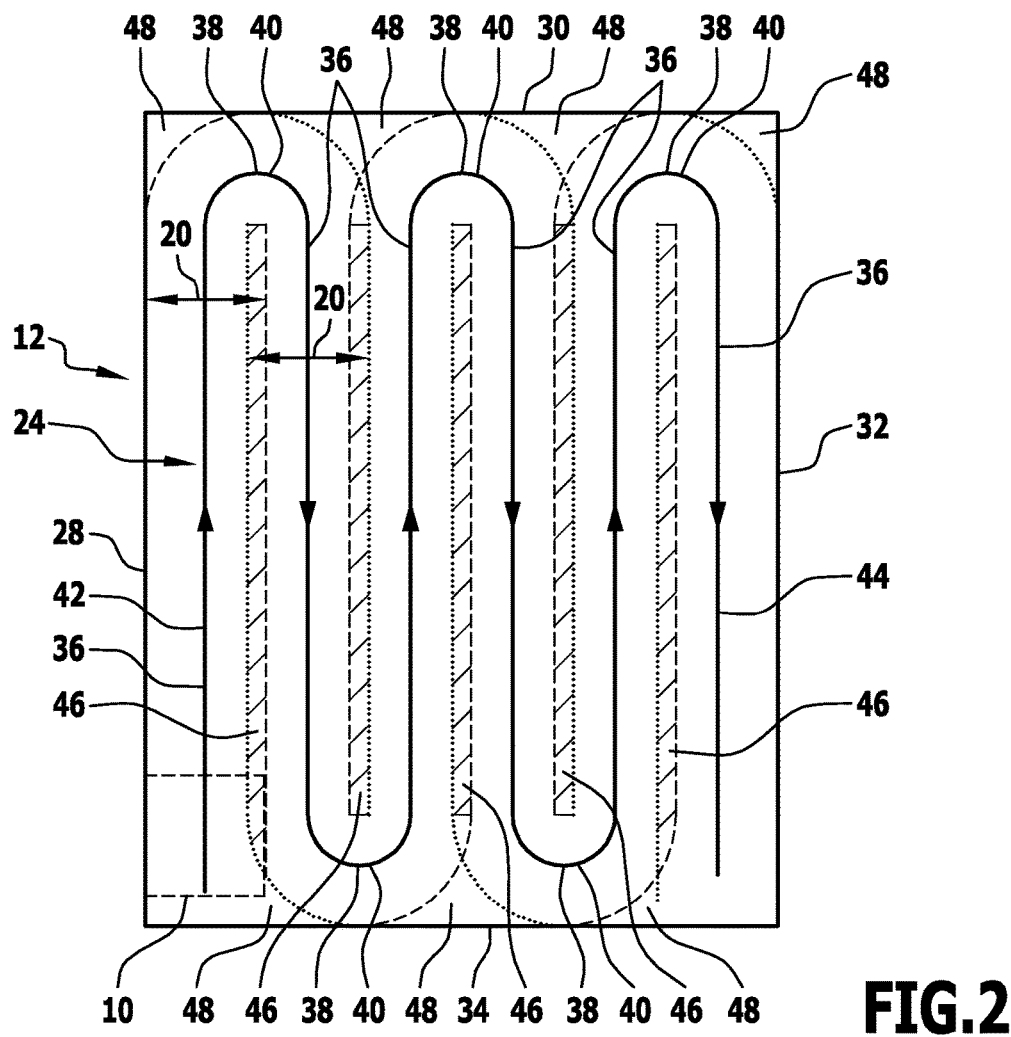
FIG. 2 schematically shows the treatment of a first floor surface selected as an example, wherein the serpentine-shaped meandering pattern upon which the treatment is based is adapted to the size of the floor surface.

An advantageous exemplary embodiment of the method in accordance with the invention will be explained hereinafter with reference to FIG. 2. FIG. 2 shows the floor surface 12 and the boundaries 28, 30, 32 and 34 thereof. The boundaries 28 and 32 lie opposite each other, and the boundaries 30 and 34 lie opposite each other. The floor surface 12 is of rectangular shape, wherein the boundaries 28, 32 extend in a longitudinal direction and the boundaries 30 and 34 extend in a transverse direction.

The boundaries 28 to 34 may be physical boundaries of the floor surface 12, based for example on sidewalls of a room comprising the floor surface 12. Non-physical boundaries are also possible. The floor surface 12 is for example a segment of a total floor surface of a room otherwise not depicted.

In its basic form, the serpentine-shaped meandering pattern 24 comprises paths 36 in side-by-side relationship to one another. Between paths 36 in side-by-side relationship to one another in each case, a change in direction of travel 38 of the floor cleaning apparatus 10 is realized. At the position of a change in direction of travel 38, the floor cleaning apparatus 10 executes a U-turn 40 via which adjacent paths 36 transition from one into the other.

The meandering pattern 24 is adapted to the size of the floor surface 12 such that the control unit 16 positions one path 36 along the boundary 28 in such a manner that the cleaning area 20 being covered when travelling that path (additionally provided with reference numeral 42) is adjacent to the boundary 28. In particular, the path 42 runs parallel to the boundary 28. When the floor cleaning apparatus 10 is moved along the path 42, close-to-the-edge cleaning of the floor surface 12 at the boundary 28 thereof can be performed.

The control unit further adapts the meandering pattern 24 such that another one of the paths 36 is positioned such that the cleaning area 20 being covered when travelling that path (additionally provided with reference numeral 44) is adjacent to the boundary 32. When the floor cleaning apparatus 10 is moved along the path 44, the floor surface 12 can be cleaned close to the edge at the boundary 32 thereof. In particular, the path 44 runs parallel to the boundary 32.

The control unit 16 further adapts the meandering pattern 24 such that further paths 36 are arranged between the paths 42 and 44. The paths 36 all run parallel to one another and are preferably equidistantly spaced from one another.

There are provided so many paths 36 that full-coverage cleaning of the floor surface 12 can be provided between the boundaries 28 and 32. In the present case, because the width of the floor surface 12 along the boundaries 30, 34 deviates from an integer multiple of the width of the cleaning area 20, this is achieved by providing so many paths 36 in side-by-side relationship to one another that the sum of the widths of the cleaning areas 20 covered when travelling the paths 36 is greater than the width of the floor surface 12 along the boundaries 30, 34.

The relative position of at least two paths 36 in side-by-side relationship to one another is selected such that the cleaning areas 20 thereof overlap in at least sections thereof. In this context, as illustrated in FIG. 2, it is advantageous for the paths 36 to be arranged relative to each other in such a manner that the cleaning areas 20 of paths 36 in side-by-side relationship to one another in each case overlap in sections thereof. A respective overlap 46 between adjacent paths 36 is highlighted with hatching in FIG. 2.

The relative position of the paths 36 is further preferably selected such that the respective overlap 46 is made the same size. This can be achieved by the paths 36 being equidistantly spaced from one another.

Furthermore, the number of paths 36 is selected by the control unit 16 in such a manner that the width of the overlaps 46 is, overall, less than the width of a cleaning area 20. It is thereby ensured that the floor surface 12 can be cleaned with as small a number of paths 36 as possible.

In cleaning the floor surface 12, the floor cleaning apparatus 10 is first driven along the path 42 (from the bottom up on the drawing sheet), thereby covering a cleaning area 20 symbolized by dashed lines. After the first U-turn 40, the floor cleaning apparatus 10 travels in the opposite direction (top down on the drawing sheet), wherein it covers a cleaning area 20 that is delimited by dots. The cleaning area overlaps with the previously covered cleaning area 20 at the first overlap 46.

Subsequently, the floor cleaning apparatus 10 travels through four further U-turns 40 and paths 36 adjoining these, wherein the last path 44 is adjacent to the boundary 32. Overall, adapting the meandering pattern 24 enables full-coverage yet swift cleaning of the floor surface 12.

An advantage of the invention providing adaptable overlapping of the treatment areas 20 can also be seen in the fact that in the case of a floor surface of non-convex shape (for example involving a jutting-out corner) the floor cleaning apparatus 10 can avoid driving into a situation in which changing the direction of travel in the direction of running the meandering pattern is not possible ("cul-de-sac situation"). This situation in conventional methods would require an additional travel distance to be completed, thereby delaying the treatment.

It is noted again that the "full-coverage" requirement includes the possibility that, based on the changes in direction of travel 38 to be performed by the floor cleaning apparatus 10, uncleaned "spandrels" 48 can be left at the outside adjacent to the boundaries 30 and 34 and may be left radially inside at the U-turns 40 because the floor cleaning apparatus 10 moves through the changes in direction of travel 38 with a finite radius of curvature.

However, provision could also be made for the floor cleaning apparatus 10 to have the capability of turning on the spot. This would provide a way for negotiating the U-turns 40 by two turns at 90° each, whereby the spandrels 48 could be minimized.

Any uncovered areas of the floor surface 12 can be cleaned for example after running the meandering pattern 24. By way of example, the spandrels 48 are cleaned by contour-parallel, close-to-the edge travel of the floor cleaning apparatus 10 at the boundaries 30, 34. By way of example, this can be realized on the basis of a subsequent, spiral-shaped treatment of the floor surface 12 which could also enable covering any spandrels left radially inside at the U-turns 40.

Areas left uncovered in running the meandering pattern 24 can also be specifically approached and cleaned.

A further advantageous exemplary embodiment of the method in accordance with the invention is explained hereinafter with reference to FIG. 3. Here, the same reference numerals as in FIG. 2 are used. The foregoing statements in respect of the exemplary embodiment of FIG. 2 also apply here.

Figure 3:
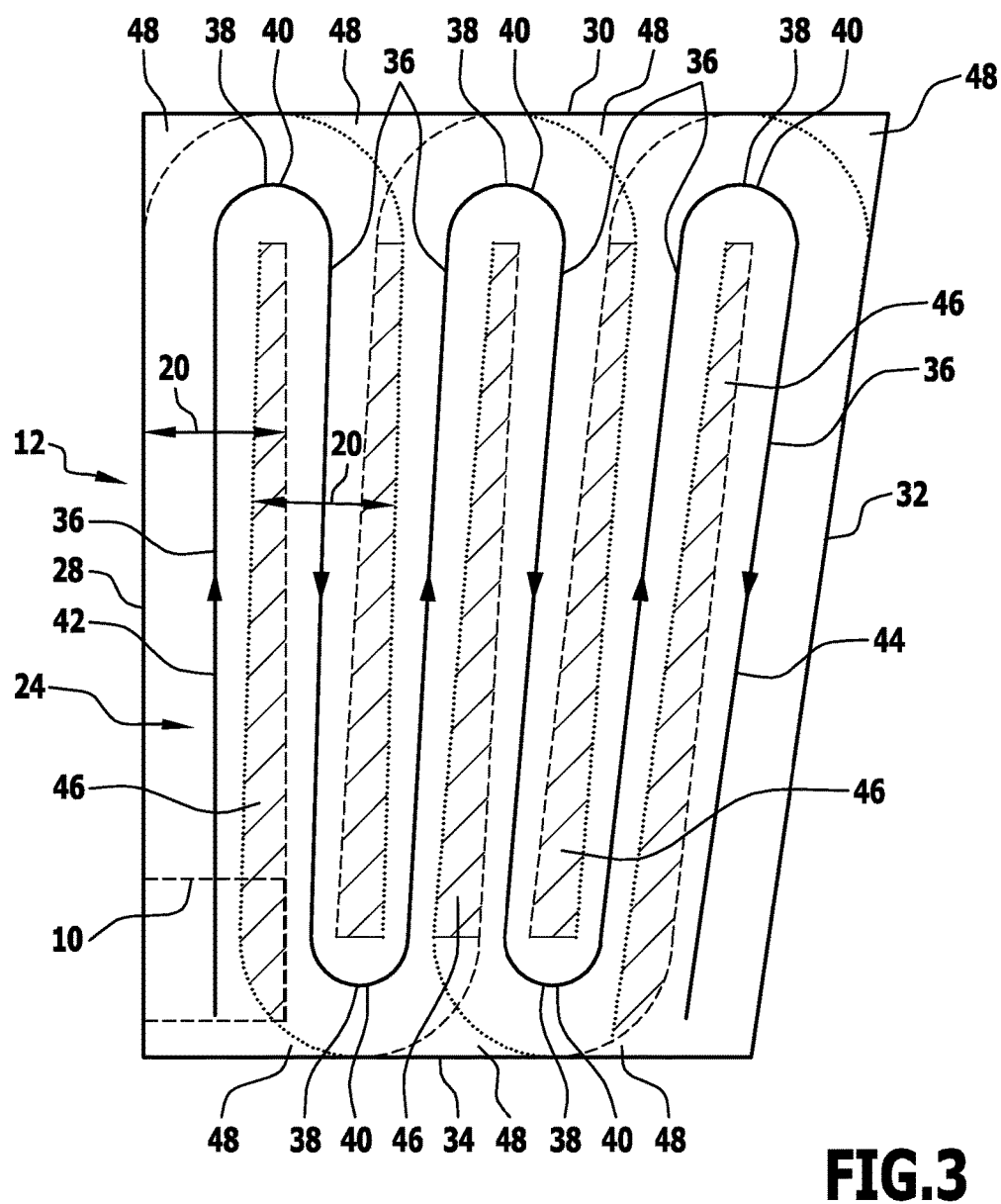
FIG. 3 schematically shows the treatment of another floor surface selected as an example, wherein the serpentine-shaped meandering pattern upon which the treatment is based is adapted to the size and to the contour of the floor surface.

In the example of FIG. 3, the floor surface 12 is not at right angles. Instead, the floor surface 12 has a trapezoidal contour, wherein the boundaries 30 and 34 are oriented parallel to each other. The boundaries 28, 32 are oriented at an angle to each other. Imaginary extension lines of the boundaries 28, 32 intersect at a point (not shown) outside the floor surface 12.

For adaptation of the meandering pattern 24 to the contour of the floor surface 12 in accordance with FIG. 3, as with the exemplary embodiment earlier described, the paths 42, 44 are arranged such that the cleaning areas 20 thereof are adjacent to the boundaries 28, 32 in order to achieve cleaning close to the edge.

For this reason, the paths 42, 44 are also oriented at an angle relative to each other, said angle corresponding to that of the boundaries 28, 32.

The remaining paths 36 are planned and positioned by the control unit such that at least two paths 36 in side-by-side relationship to one another make an angle with each other that is less than the angle between the boundaries 28, 32. Expressed differently, at least two paths 36 in side-by-side relationship to one another are arranged not parallel to each other but at an incline to each other.

In particular, more than two and preferably all paths 36 in side-by-side relationship to one another are positioned such that adjacent paths 36 are in each case oriented at an angle to each other. In this arrangement, the paths 36 are preferably positioned such that the respective angle between adjacent paths 36 is of the same size. This is depicted in FIG. 3.

In the exemplary embodiment of FIG. 3, too, the cleaning areas 20 of adjacent paths overlap in sections thereof at a respective overlap 46 in order to achieve a full-coverage cleaning of the floor surface 12, wherein in this case as well uncleaned spandrels 48 due to changes in direction of travel 38 can remain.

Both in the variant in accordance with FIG. 2 and in the variant in accordance with FIG. 3, it is advantageous for the meandering pattern 24 to be oriented within the floor surface 12 by the control unit 16 in such a manner that the number of changes in direction of travel 38 is minimized. This is achieved by the paths 36 extending in a longitudinal direction of the rectangular-shaped or trapezoidal-shaped floor surface 12 in each case.

The invention claimed is:

1. A method for treating a floor surface using a self-propelled and self-steering floor treating apparatus, wherein the treatment of the floor surface is based on a pattern along which the floor treating apparatus is moved, wherein the pattern has paths in side-by-side relationship to one another and wherein when the floor treating apparatus travels a path, a respective treatment area is covered and treated by the floor treating apparatus, wherein a control unit of the floor cleaning apparatus adapts the pattern to at least one of the size and contour of the floor surface such that boundaries of the floor surface opposite each other have in each case a path extending therealong with a treatment area adjacent to the boundary for performing close-to-the-edge treatment and the control unit arranges intermediate paths such that full-coverage treatment of the floor surface is realized, wherein the control unit arranges the relative position of at least two paths in side-by-side relationship to one another such that the treatment areas thereof overlap at least in sections thereof.

2. The method in accordance with claim 1, wherein the relative position of more than two paths in side-by-side relationship to one another is selected such that the treatment areas of paths in side-by-side relationship to one another in each case overlap in at least sections thereof.

3. The method in accordance with claim 2, wherein the relative position of all of the paths is selected such that the treatment areas of paths in side-by-side relationship to one another in each case overlap at least in sections thereof.

4. The method in accordance with claim 2, wherein the position of the paths is selected such that the respective overlap is made the same size.

5. The method in accordance with claim 1, wherein the relative position of all paths in side-by-side relationship to one another is selected such that the paths are equidistantly or substantially equidistantly spaced from one another.

6. The method in accordance with claim 1, wherein the number of the paths in side-by-side relationship to one another is selected such that the width of an overall overlap which results from the overlap of the treatment areas of paths in side-by-side relationship to one another is less than the width of a treatment area.

7. The method in accordance with claim 1, wherein the paths in side-by-side relationship to one another are oriented parallel to each other.

8. The method in accordance with claim 1, wherein, when boundaries of the floor surface opposite each other are oriented at an angle relative to each other, the relative position of at least two paths in side-by-side relationship to one another is selected such that these enclose an angle.

9. The method in accordance with claim 8, wherein the angle is less than the angle between the boundaries.

10. The method in accordance with claim 8, wherein the relative position of more than two paths in side-by-side relationship to one another is selected such that these enclose a respective angle.

11. The method in accordance with claim 10, wherein the relative position of all of the paths is selected such that paths in side-by-side relationship to one another in each case enclose an angle.

12. The method in accordance with claim 10, wherein the position of the paths is selected such that the respective angle is of the same size.

13. The method in accordance with claim 1, wherein the pattern is oriented within the floor surface such that the number of changes in direction of travel for full-coverage treatment of the floor surface is minimized.

14. The method in accordance with claim 1, wherein a serpentine-shaped meandering pattern is used as a basis.

15. The method in accordance with claim 1, wherein a spiral-shaped floor surface boundary-following pattern is used as a basis.

16. The method in accordance with claim 1, wherein, as the floor treatment apparatus, a floor cleaning apparatus is used by which the floor surface is cleaned.

17. A self-propelled and self-steering floor treating apparatus, comprising a chassis for travelling over the floor surface and a control unit for controlling the chassis and at least one floor treating unit defining a treatment area, wherein the chassis is controllable by the control unit such that the treatment of the floor surface can be based on a pattern along which the floor treating apparatus is moved, wherein the pattern comprises paths in side-by-side relationship to one another and wherein when the floor treating apparatus travels a path, the respective treatment area is covered and treated by the floor treating apparatus, wherein the control unit adapts the pattern to at least one of the size and contour of the floor surface such that boundaries of the floor surface opposite each other have in each case a path extending therealong with a treatment area adjacent to the boundary for performing close-to-the-edge treatment and the control unit arranges intermediate paths such that full-coverage treatment of the floor surface is realized, wherein the control unit arranges the relative position of at least two paths extending in side-by-side relationship to one another such that the treatment areas thereof overlap at least in sections thereof.

18. The floor treatment apparatus in accordance with claim 17, wherein the floor treating apparatus is a floor cleaning apparatus.

* * * * *